US012556755B1

(12) United States Patent
Namballa et al.

(10) Patent No.: US 12,556,755 B1
(45) Date of Patent: Feb. 17, 2026

(54) QUALITY OF EXPERIENCE OPTIMIZATION FOR USER ENGAGEMENT OPTIMIZATION

(71) Applicant: Amazon Technologies, Inc., Seattle, WA (US)

(72) Inventors: Chitti Babu Namballa, Bellevue, WA (US); Sharathabhinav Dharmaji, San Jose, CA (US); Pragyana K. Mishra, Seattle, WA (US); Mohan Padmanabhan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 18/363,634

(22) Filed: Aug. 1, 2023

(51) Int. Cl.
*H04N 21/2662* (2011.01)
*H04N 21/25* (2011.01)

(52) U.S. Cl.
CPC ....... *H04N 21/2662* (2013.01); *H04N 21/251* (2013.01)

(58) Field of Classification Search
CPC .................. H04N 21/2662; H04N 21/251
USPC ..................................................... 725/116
See application file for complete search history.

(56) References Cited

U.S. PATENT DOCUMENTS

| 11,468,348 | B1 * | 10/2022 | Cui ..................... G06F 18/211 |
| 2016/0021376 | A1 * | 1/2016 | Andreopoulos ...... G06T 7/0002 348/181 |
| 2021/0064517 | A1 * | 3/2021 | Wong .................. G06F 11/3698 |

* cited by examiner

*Primary Examiner* — Alfonso Castro
(74) *Attorney, Agent, or Firm* — Athorus, PLLC (57) ABSTRACT

Disclosed are systems and methods to optimize the quality of experience of a video streaming session through counterfactual estimation to measure the impact of streaming quality on user engagement. The impact on user engagement may consider both short term user engagement (e.g., current session) and long term user engagement (e.g., user engagement over days, weeks, months, or years).

20 Claims, 7 Drawing Sheets

QUALITY OF EXPERIENCE OPTIMIZATION FOR USER ENGAGEMENT OPTIMIZATION

BACKGROUND

Video streaming applications transmit video content by dividing it into small units of data, called "fragments," which are sent over a network, such as the Internet, to a user device. These fragments are reassembled and played on the user device in real-time or near-real time. Video is typically encoded for delivery and compressed to reduce the size of the video for transmission over the network. As demand for high-quality video streaming grows, there is a need to enhance the viewing experience for attracting and retaining viewers. However, increasing the streaming quality for a large number of viewers is difficult due to constraints such as network bandwidth, throughput, memory and device limitations. Some applications use Adaptive Bitrate ("ABR") to adjust the video quality based on a user's network conditions. ABR uses algorithms that make streaming-quality decisions based on metrics like delay at playback start, buffering time, video quality, frequency of quality changes during streaming, etc. Balancing these metrics to optimize the overall viewing experience is challenging as they are interdependent and often conflicting with one another. For example, streaming high-quality video despite poor network bandwidth may result in frequent buffering. Likewise, reducing delay of playback start may increase the frequency of quality-changes during streaming.

Currently, these conflicting metrics are manually adjusted using control parameters, which are often tuned through A/B testing and extensive analysis. It currently takes several months of manual effort to determine the parameters that properly balance these interrelated and conflicting factors. However, finding the optimal parameters is not always possible because manually exploring the space of all possible parameters is infeasible and impractical when multiple interdependent factors are in play. Still further, current optimization techniques only consider the current viewing experience and not long-term engagement of the user.

DETAILED DESCRIPTION

Disclosed are systems and methods that optimize the Quality of Experience ("QoE") of a video streaming session through counterfactual estimation to measure the impact of streaming quality on user engagement. The impact on user engagement may consider both short term user engagement (e.g., current session) and long term user engagement (e.g., user engagement over days, weeks, months, years).

A discussed further below, a series of regression models may be defined to determine the causal relationship of various impairments (e.g., re-buffering, time to first frame, resolution) on user engagement—short term user engagement and/or long term user engagement. The determined causal relationships may then be utilized to optimize the QoE for the user during the current viewing session. As discussed further below, past viewing history of users of a media service may be utilized to determine confounding effects on user engagement and use that information to model the causal impact of QoE on user engagement. For example, a causal forest and Double Machine Learning model may be utilized to build causal relationships between impairments and user engagement in two stages. In the first stage, models, such as regression models, may be utilized to estimate the expected level of impairments in the current session and/or estimate future engagement of the user. The residuals from those models may be used in the second stage to remove the confounding effects and to understand the causal relationship of additional impairments that the user may experience as part of the current session. Such information may then be utilized to set the viewing parameters, such as ABR, compression, bitrate, encoding, etc., for the current viewing session.

The disclosed implementations enable both an improved viewing experience for the user during the current session and also provide an understanding as to the impact that impairments experienced during the current session will have on future user engagement with the media service.

As discussed further below, while the disclosed implementations are focused primarily on selecting parameters, such as ABR, for a current session, the disclosed implementations may also be utilized to select an appropriate content delivery network ("CDN") or node of a CDN, from which to deliver content to the user as part of the session.

Figure 1:
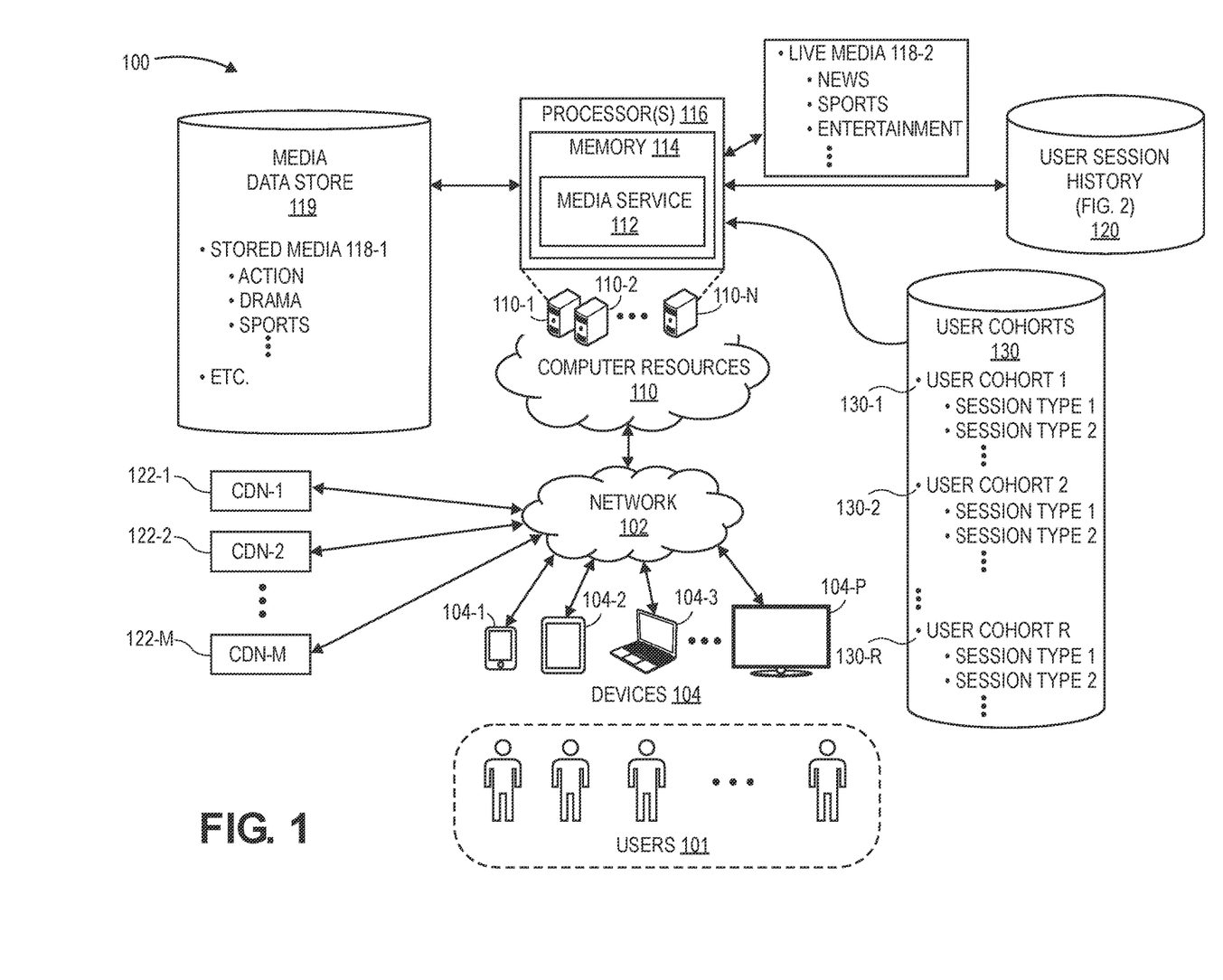
FIG. 1 is an illustration of an environment for delivering media files content with a quality of experience optimized for future user engagement, in accordance with disclosed implementations.

FIG. 1 is an illustration of an environment 100 for delivering and presenting media, such as streaming video, to user devices, in accordance with disclosed implementations.

As illustrated, a media service 112 may provide media 118, such as videos maintained in a media data store 119 to one or more devices 104 of any of a variety of device types for presentation to one or more users 101. Media 118, as used herein, may include a video media file, an audio media file, audio/video media file, a captions file, a metadata file, a virtual reality content file, or any other form of content that may be sent, streamed, downloaded, or otherwise provided by the media service 112 to one or more devices 104 of any of a variety of device types. For ease of discussion, the majority of the examples discussed herein relate to video or streaming video media. However, the disclosed implementations are equally applicable to any type of media and are not limited to video.

As discussed in further detail below, the media service 112 may maintain stored media 118-1 in one or more media data stores 119. Stored media 118-1, also sometimes referred to as on-demand media, may be streamed or downloaded to devices 104 through interaction with the media service 112. In addition to stored media 118-1, the media service may also provide live media 118-2. In some instances, the stored media 118-1 and/or live media 118-2 may be sent directly by the media service 112 to a device 104. In other implementations, instances of stored media 118-1 or live media 118-2 may be maintained by one or more CDNs, such as CDN-1 122-1, CDN-2 122-2, through CDN-M 122-M and sent from a CDN to the device 104. Stored media 118-1 and/or live media 118-2 may include a variety of different types or categories. For example, stored media 118-1 and/or live media 118-2 may be categorized as action, drama, sports, entertainment, etc.

The media service 112 may also maintain one or more user session history data stores 120 that maintains information about different user sessions. As discussed further below with respect to FIG. 2, user session history may include an indication of user characteristics of the user, device characteristics, interaction type, the QoE, user engagement, etc.

Likewise, the media service 112 may also maintain one or more user cohort data stores 130. In some examples, users 101 of the media service 112 may be divided into cohorts based on one or more similarities between the different user viewing experiences. For example, user cohort 1 130-1 may include users that have similar bandwidth, a paid subscription to the media service 112, have similar viewing patterns (e.g., types of media, duration of viewing, etc.), and/or one or more other similarities. User cohort 2 130-2 may include another set of users that have similar user characteristics. Any number of cohorts 130-1, 130-2, through 130-R may be maintained in the user cohort data store 130. Likewise, in some implementations, each cohort may be subdivided or classified into different session types based on, for example, the type of media viewed by the user associated with that cohort. For example, a first session type may be for sports media, a second session type may be for news media, while another session type may be for stored media.

In some implementations, user identifying information may be removed from information included in the user session history data store 120 and/or the user cohorts data store 130 and only non-user identifiable information utilized with the disclosed implementations.

Any number and/or types of devices 104, such as cell phones 104-1, tablets 104-2, laptops 104-3, televisions 104-P, etc., may be utilized with the disclosed implementations. In some examples, device information (e.g., network connection type, bandwidth, location, device type, display resolution, memory) may be provided by a device 104 to the media service 112 and included in user session history 120 for a viewing session and/or utilized to define or include a user 101 in one or more cohorts. Examples of other device types that may be utilized with the disclosed implementations include, but are not limited to, cinema projectors, home theater projectors, wearables, virtual reality devices, emissive displays, emissive display arrays, etc. In addition, with the disclosed implementations, as newer devices with newer capabilities and/or dimensions are created, additional device types may be established for those new device types.

The media service 112 may execute on one or more computing resource(s) 110. The computing resource(s) 110 may be remote from devices 104 and each device 104 may be remote from other devices of the same or different device types. Likewise, the computing resource(s) 110 and devices 104 may be configured to communicate over a network 102, such as the Internet.

As illustrated, the computing resource(s) 110 may be implemented as one or more servers 110(1), 110(2), . . . , 110(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc.

The server system(s) 110 does not require end-user knowledge of the physical location and configuration of the system that delivers the services. Common expressions associated for these remote computing resource(s) 110 include "on-demand computing," "software as a service (SaaS)," "platform computing," "network-accessible platform," "cloud services," "data centers," and so forth. Each of the servers 110(1)-(N) include one or more processors 116 and memory 114, which may store or otherwise have access to the media service 112, as described herein.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

Figure 2:
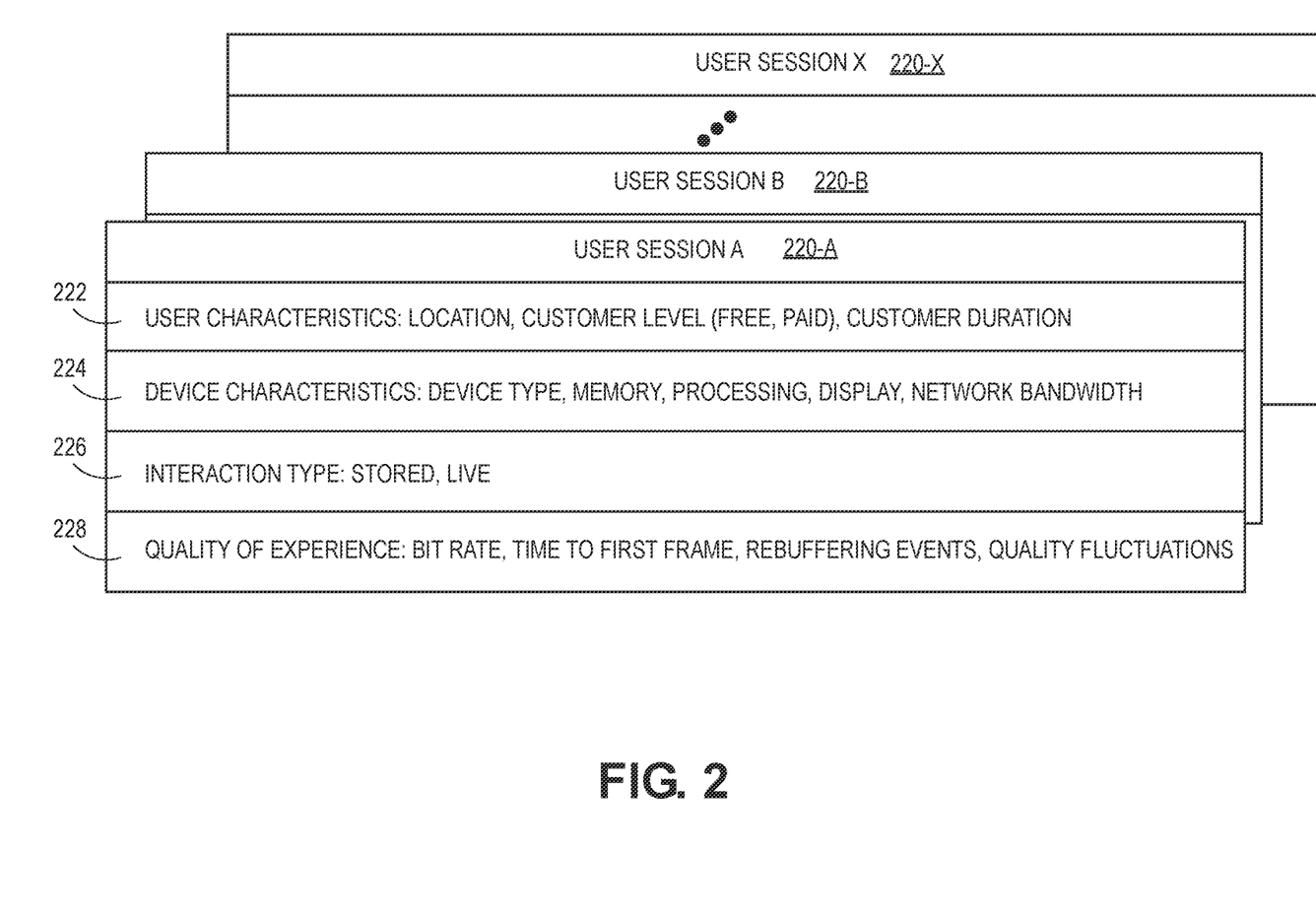
FIG. 2 is an illustration of example user session history, in accordance with disclosed implementations.

FIG. 2 is an illustration of example user session histories, in accordance with disclosed implementations. As discussed herein, user session history may be utilized with the disclosed implementations to determine, among other information, estimated current session QoE, future user engagement estimates, QoE optimization, etc.

A user session history 220-A, 220-B, through 220-X may be maintained for every user and every session between a user and the media service. As such, there may be thousands, millions, or more, instances of user session history maintained and utilized by the disclosed implementations. In some examples, as discussed below, user session history may only be maintained for a defined period of time. In other examples, different weightings may be applied to user session histories of different times, with more recent user session history having a higher weight than older user session history.

As noted above, in some implementations, user identifiable information may not be included in user session history and only information needed by the disclosed implementations may be maintained. In some examples, a random user identifier that does not directly relate to the user may be generated and included in the user session history.

In the illustrated example, user session history 220 may include, but is not limited to, user characteristics 222 of the user participating in the session, device characteristics 224 of the device used for the session, the interaction type 226 for the session, and the QoE 228 for the session. User characteristics 222 for a session may include, but are not limited, the location of the user, the customer level (e.g., whether the user is a paid customer of the media service, a trial customer, a free customer, etc.), the duration of time the user has been a customer, the frequency of engagement between the user and the media service, the duration or average duration of each engagement with the media service, etc. Device characteristics 224 for a session may include, but are not limited to, device type, device location, network connectively, bandwidth, display resolution, processing capabilities, memory, power supply type, etc. Interaction type 226 for a session may include, but is not limited to, whether the interaction is for live media or stored media. In some implementations, the interaction type 226 may also indicate the type of media, whether live or stored. For example, the type of media may indicate whether the media is of the type sports, news, entertainment, drama, action, romance, comedy, biography, nature, cooking, etc. QoE 228 for the session may include an indication of any impairments experienced during the session, such as rebuffering events, restarts, changes in bitrate, the display resolution, time to presentation of the first frame, buffer capacity usage, rebuffering events, quality fluctuations, etc.

Figure 3:
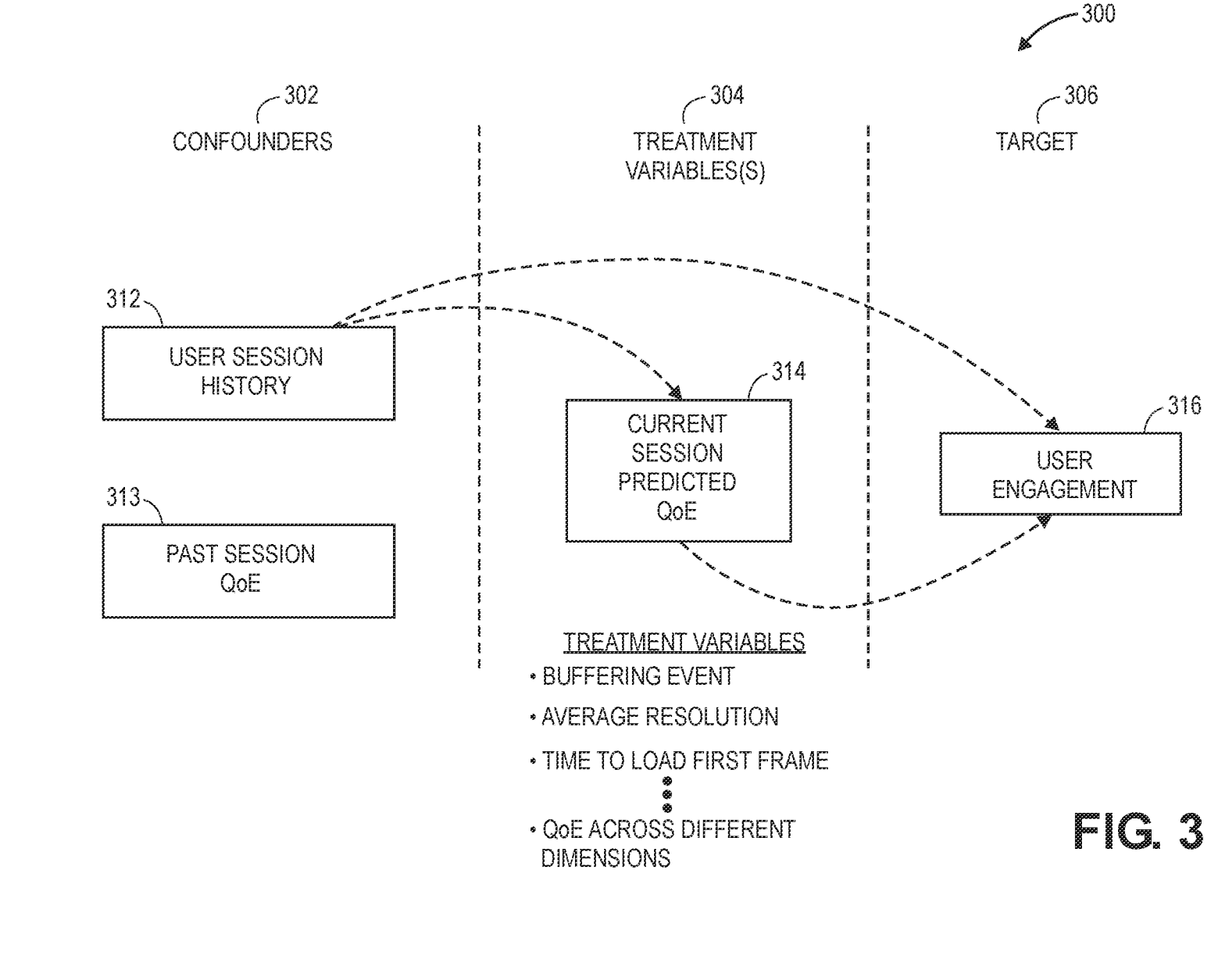
FIG. 3 is an example transition diagram for delivering a media file optimized for future user engagement, in accordance with disclosed implementations.

FIG. 3 is an example transition diagram 300 for optimizing quality of experience of delivering a media file optimized for future user engagement, in accordance with disclosed implementations.

As discussed herein, user session history 312, such as the user session history maintained by the media service and discussed above with respect to FIGS. 1 and 2, and session QoE 313 for past user sessions may be obtained and processed to determine one or more confounders 302 that may affect a current user session, user engagement, and/or the QoE of a session. As is known, a confounder is a variable whose presence affects the variables being studied so that the results do not reflect the actual relationship between the variables under study. In the present disclosure, a confounder 302 can be defined as a variable that, when added to a regression model, such as the models discussed herein, changes the estimate of the association between the treatment variables 304 (e.g., buffering events, average resolution, time to load first frame, QoE, etc.) and the dependent variable, or target 306, of user engagement 316 during a session.

As illustrated in FIG. 3, user session history 312 and session QoE 313 may be used to measure the confounding impact on user engagement 316 of the current session and/or future engagements and to measure the causal impact of the QoE of the current session 314 on future user engagement 316.

User session history, user characteristics, device characteristics, QoE may be collectively referred to herein as session history or session data.

Figure 4:
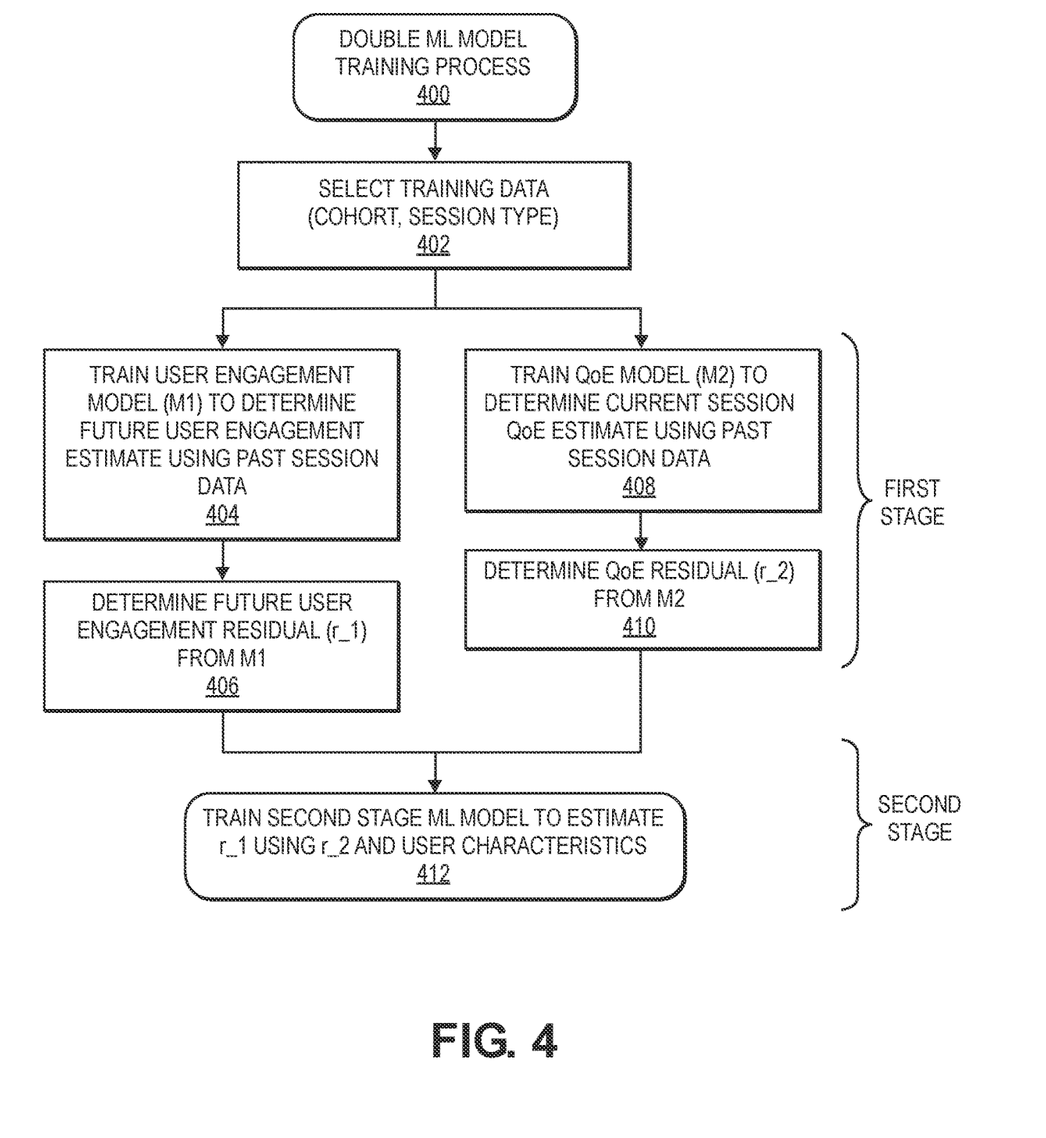
FIG. 4 is an example double machine learning model training process, in accordance with disclosed implementations.

FIG. 4 is an example double machine learning model training process 400, in accordance with disclosed implementations. The example process 400 may be performed to train double machine learning models for each of a plurality of different user cohorts, different session types within the different cohorts, etc. Once trained, the appropriate model may be selected and utilized to determine the QoE for a current session to optimize, for example, short term and/or long term user engagement of the user.

The example process 400 begins by selecting training data that is to be used to train the model, as in 402. For example, session data maintained in a session data store for a particular cohort and session type of that cohort may be selected to train a double machine learning (ML) model for that cohort and/or session type. For example, a cohort of users that have similar user characteristics for which a model is to be trained may be defined and historical session data stored for users associated with that cohort may be selected. If the model is being trained for a particular session type (e.g., on demand, streaming, sports, news, etc.) of that cohort, the session data may be further reduced to session data corresponding to the session type. In some implementations, different weights may be assigned to selected session data based on the recency of the session data, with more recent session data assigned a higher weighting and thus a larger impact on the training of the ML model.

Utilizing the selected session data as training data, a user engagement ML model ("M1") may be trained to determine a future engagement estimate (short term and/or long term), as in 404. In some implementations, the user engagement ML model may be any of a variety of non-linear regressions models. The user engagement ML model may be trained, for example, by utilizing some or all of user characteristics, device characteristics, session type, etc., as inputs to train the model and the corresponding user engagement or duration of sessions as labels to train the model.

As part of training, a residual or error, referred to herein as a future user engagement model residual (r_1), of the future user engagement model may be determined, as in 406.

In addition to training the future user engagement ML model, the training data may also be used to train a current session QoE estimate ML model ("M2") to determine a current session QoE estimate, as in 408. In some implementations, the current QoE estimate ML model may be any of a variety of non-linear regression models. The current session QoE estimate model may be trained, for example, by utilizing some or all of user characteristics, device characteristics, session type, etc., as training inputs to train the model and the resulting QoE as labels to train the model.

As part of training, a residual or error, referred to herein as a QoE residual (r_2), of the current session QoE estimate ML model may be determined, as in 410.

While the above example illustrates the first stage of the double ML model as being trained with two separate ML models, namely the future user engagement ML model and the current session QoE model, in other implementations, a single model may be trained for both the future user engagement estimate and the current session QoE estimate and corresponding residuals determined.

Utilizing the future user engagement residual (r_1), the QoE residual (r_2), and the user characteristics of the training data as inputs, the second stage may be trained. The second stage may include training a ML model to estimate the user engagement residual (r_1) using the QoE residual (r_2) and the user characteristics, as in 412. For example, the second stage ML model may receive the user engagement residual (r_1) output from the future user engagement ML model, the QoE residual (r_2) output from the current session QoE estimate model, and the user characteristics of the session data as inputs and output one or more parameters or functions that may be applied to a streaming session, as in 412. For example, when considering bitrate and rebuffering, the second stage ML model may consider the different residuals and determine a function that indicates, for example through a weighting, which is more important between bitrate and rebuffering and that function may be applied to the session. Accordingly, different quality indexes may be processed using the ML model(s) and the quality index with the high function or utility may be selected and applied to the session. The parameter, function, or utility is generally referred to herein as a parameter.

The second stage ML model may be, for example, a causal decision tree model, a different regression model for each of the different cohorts of users, a different regression model for each of the different session types, etc.

Figure 5:
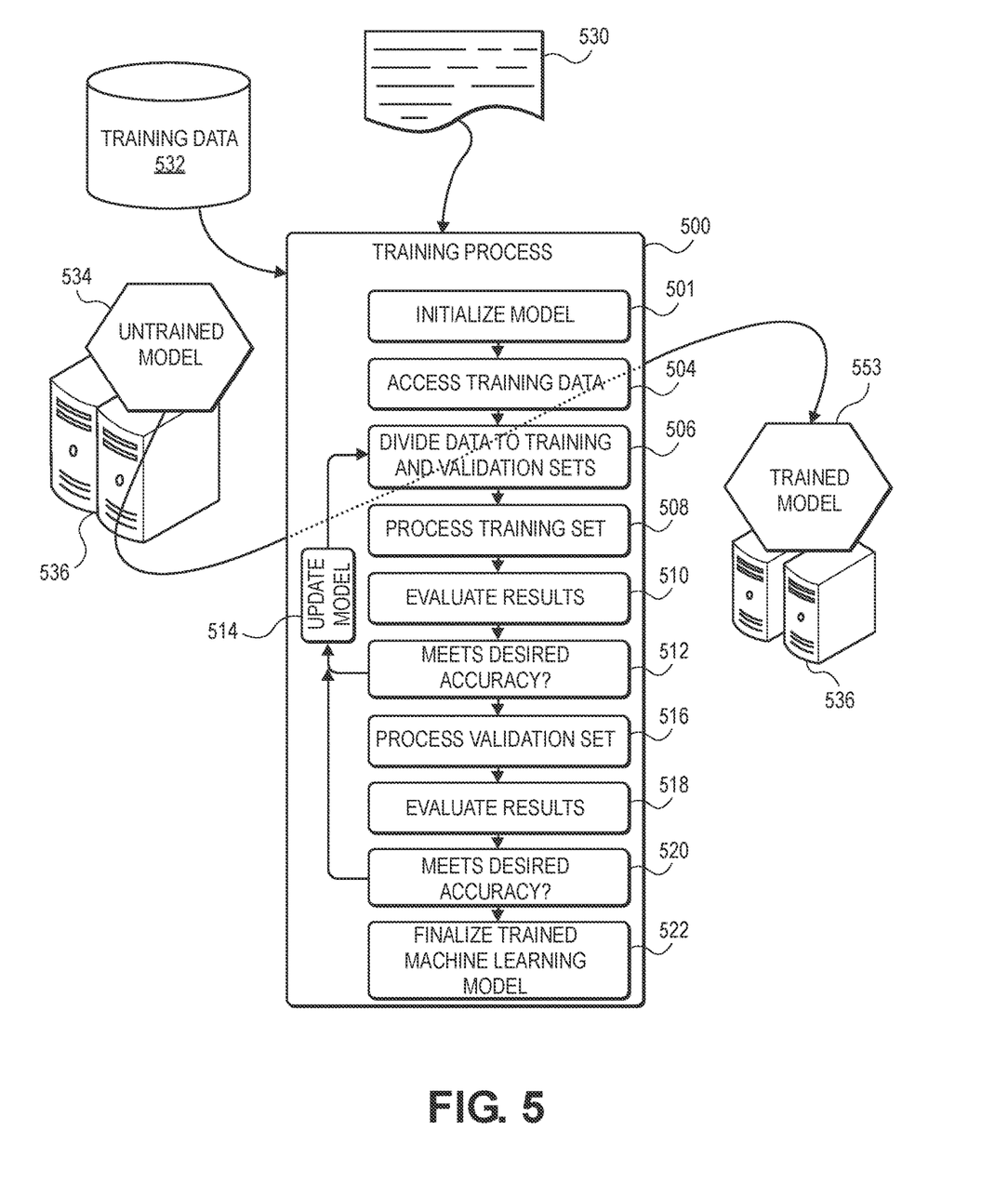
FIG. 5 is an example training process for training a machine learning model, in accordance with disclosed implementations.

FIG. 5 illustrates an exemplary overall process 500 of training a ML model in accordance with aspects of the disclosed subject matter. Indeed, as shown in FIG. 5, the training process 500 is configured to train an untrained ML model 534 operating on a computer system 536 to transform the untrained ML model into a trained ML model 553 that operates on the same or another computer system, such as a remote computing resource 536. In some implementations, the example process 500 may be used to train each of the user engagement ML model, the QoE model, and/or the second stage ML model independently. In other examples, a single first stage model may be trained that encompasses both the user engagement ML model and the QoE ML model and a separate, second stage ML model may be trained independently. In still other examples, a double ML model that encompasses all of the ML models discussed with respect to FIG. 4 may be trained end-to-end using the example overall process 500.

In the course of training, as shown in the training process 500, at step 501, the untrained ML model 534 is initialized with training criteria 530. Training criteria 530 may include, but is not limited to, information as to a type of training, and number of layers to be trained, etc.

At step 504 of the training process 500, a corpus of training data 532, which may include session data for a cohort, session type data, QoE data for sessions, etc., is accessed. For example, if training is to generate a trained ML model 553 that outputs an optimized ABR for a current session to optimize for future short term and/or long term user engagement, the training data 532 may include session data and QoE data corresponding to a cohort for which the ML model is to be trained.

While the disclosed implementations discuss the use of labeled training data, in other implementations, the training data 532 may also or alternatively include unlabeled training data.

With the training data 532 accessed, at step 506 the training data is divided into training and validation sets. Generally speaking, the items of data in the training set are used to train the untrained ML model 534 and the items of data in the validation set are used to validate the training of the ML model. As those skilled in the art will appreciate, and as described below in regard to much of the remainder of the training process 500, there are numerous iterations of training and validation that occur during the training of the ML model.

At step 508 of the training process, the data items of the training set are processed, often in an iterative manner. Processing the data items of the training set include capturing the processed results. After processing the items of the training set, at step 510, the aggregated results of processing the training set are evaluated, and at step 512, a determination is made as to whether a desired accuracy level has been achieved. If the desired accuracy level is not achieved, in step 514, aspects of the ML model are updated in an effort to guide the ML model to generate more accurate results, and processing returns to step 506, where a new set of training data 532 is selected, and the process repeats. Alternatively, if the desired accuracy level is achieved, the training process 500 advances to step 516.

At step 516, and much like step 508, the data items of the validation set are processed, and at step 518, the processing accuracy of this validation set is aggregated and evaluated. At step 520, a determination is made as to whether a desired accuracy level, in processing the validation set, has been achieved. If the desired accuracy level is not achieved, in step 514, aspects of the ML model are updated in an effort to guide the ML model to generate more accurate results, and processing returns to step 506. Alternatively, if the desired accuracy level is achieved, the training process 500 advances to step 522.

At step 522, a finalized, trained ML model 553 is generated. Typically, though not exclusively, as part of finalizing the now-trained ML model 553, portions of the ML model that are included in the model during training for training purposes are extracted, thereby generating a more efficient trained ML model 553.

In some implementations, the process 500 may be periodically performed to update training of an existing trained ML model 553 to consider more recent user session history, etc.

Figure 6:
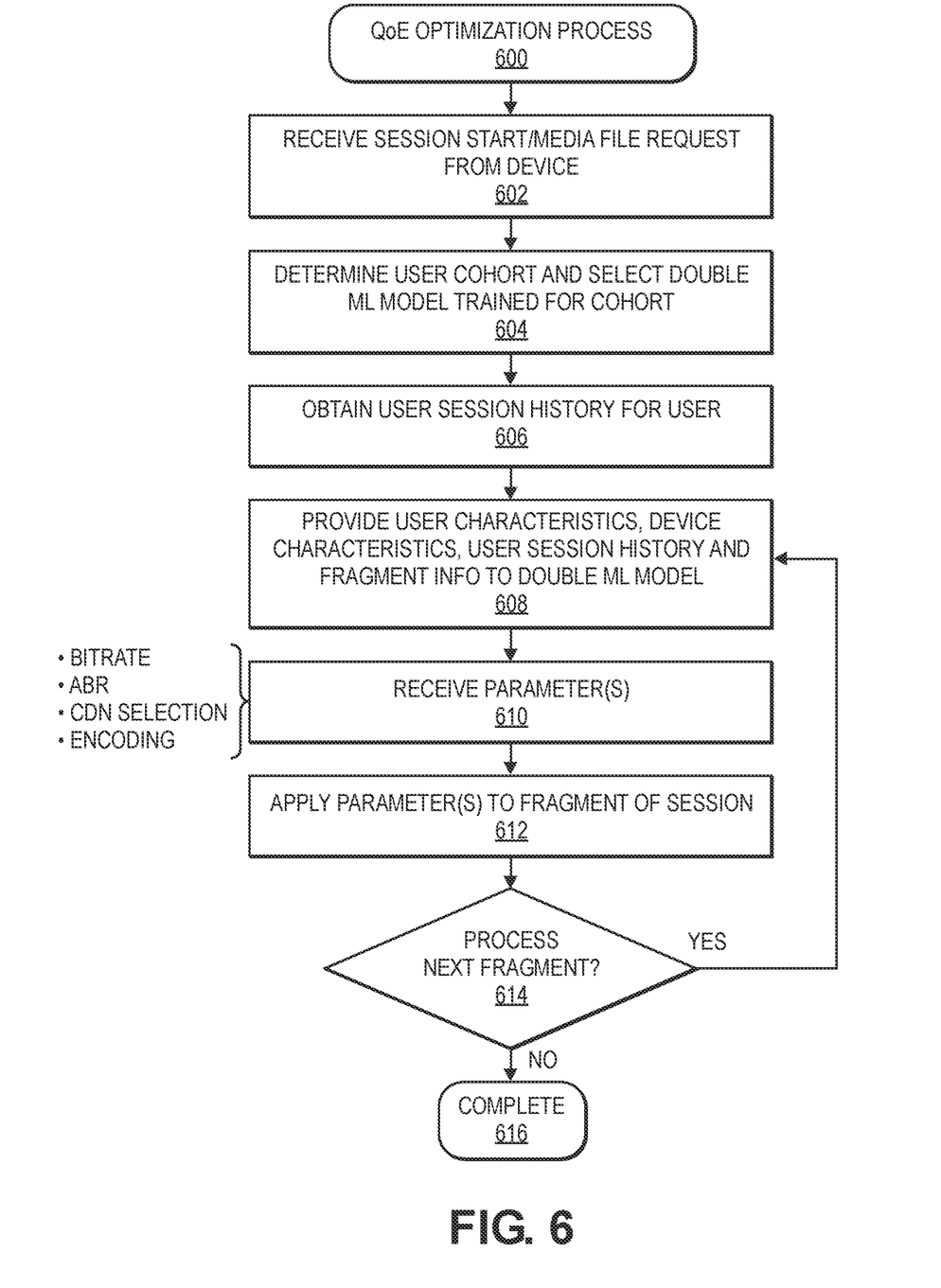
FIG. 6 is an example quality of experience optimization process, in accordance with disclosed implementations.

FIG. 6 is an example quality of experience optimization process 600, in accordance with disclosed implementations.

The example process 600 begins upon receipt of a session start and/or media file request from a user device, as in 602. A session start/media file request may include, but is not limited to, receipt of an access request from the user device, a request for media from the user device, a request for a list of media or an updated list of media from the user device, etc. Included in that request may be some or all of the session data (e.g., user characteristics, device characteristics, etc.)

Based on the user characteristics and the device characteristics, a user cohort may be determined, and a double model trained for that cohort may be selected, as in 604. As discussed above, in some implementations, a different double ML model may be trained for each of a plurality of cohorts. In some implementations, additional models for different session types within a cohort may also be trained. In other implementations, the cohorts may be further defined, at least in part, on session type.

Session history for the user that is requesting the media may also be obtained, as in 606.

User characteristics for the user, device characteristics for the device, user session history, and fragment information of the fragment under consideration may then be provided to the selected double ML model, as in 608. As discussed above, the double ML model, upon receiving the inputs, processes those inputs and provide, as an output, one or more parameters that may be applied to the current session to optimize the QoE of the fragment for current session based on future user engagement, as in 610.

Finally, the received parameter(s) are then applied to the fragment for the session and used to send media to the requesting device, as in 612. Alternatively, if the selected double ML model is sent to the requesting device, the requesting device may determine and request the fragment for the session.

After sending or obtaining the requested fragment for the session, a determination may be made as to whether a next fragment is to be processed using the double ML model for the session, as in 614. If it is determined that a next fragment for the session is to be processed, the example process 600 returns to block 608 and continues. If it is determined that a next fragment is not to be processed for the session, the example process 600 completes, as in 616.

Figure 7:
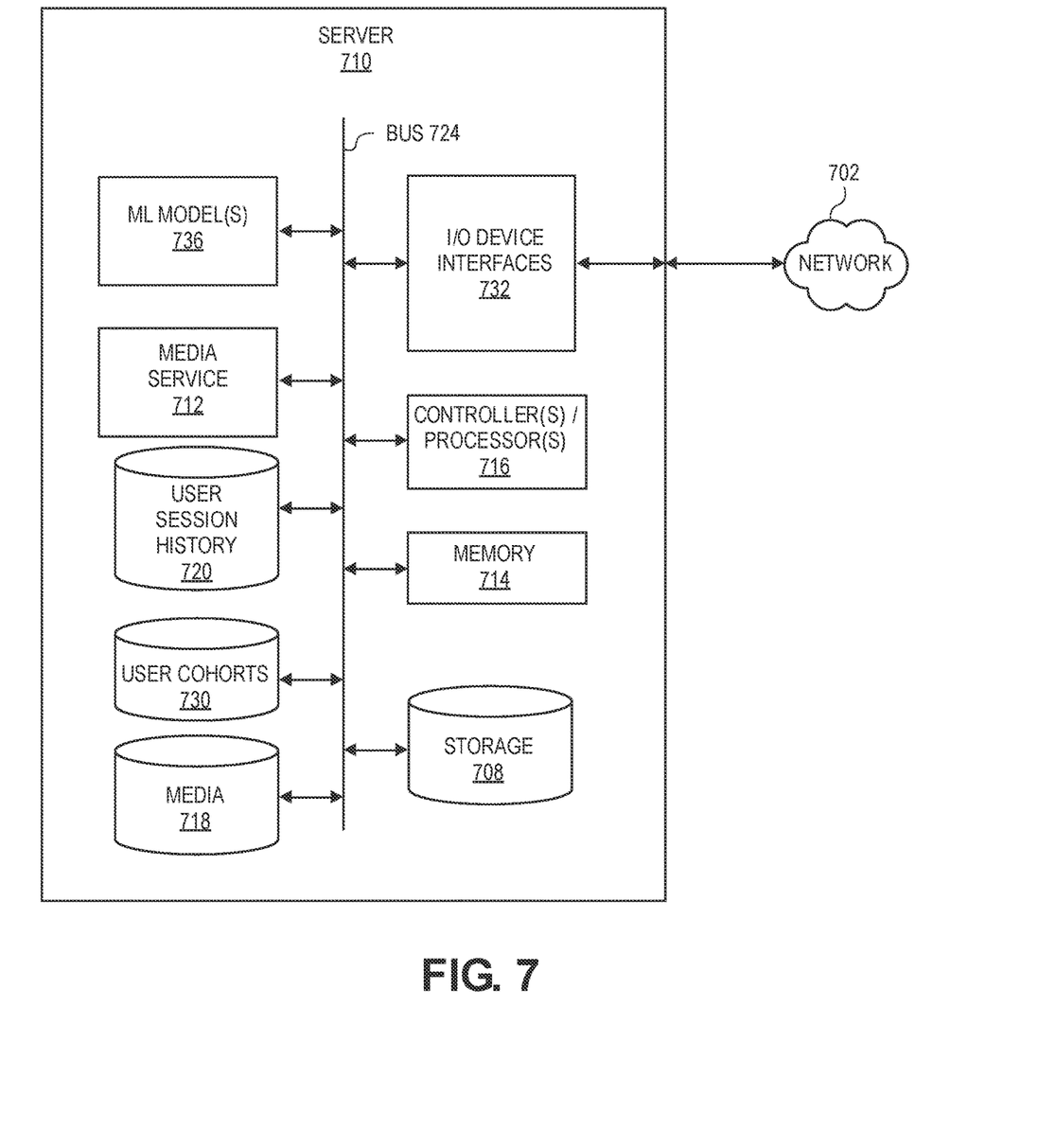
FIG. 7 illustrates example components of a server, in accordance with described implementations.

FIG. 7 is a block diagram conceptually illustrating example components of a remote computing device, such as a remote server 710 that may include one or more trained ML models 736 as discussed herein and/or include the media service 712. Multiple such servers 710 and/or ML models 736 may be included in the system. In operation, the remote server 710 may include computer-readable and computer-executable instructions, as discussed further below.

The remote server 710 may include one or more controllers/processors 716 that may include a central processing unit (CPU) for processing data and computer-readable instructions, and a memory 714 for storing data and instructions. The memory 714 may individually include volatile random-access memory (RAM), non-volatile read only memory (ROM), non-volatile magnetoresistive random-access memory (MRAM) and/or other types of memory. The remote server 710 may also include a data storage component 708, for storing data, controller/processor-executable instructions, etc. Likewise, the server 710 may include or be operable to access a user session history data store 720, a user cohorts data store 730, and/or a media data store 718. Each data storage component and/or data store may individually include one or more non-volatile storage types such as magnetic storage, optical storage, solid-state storage, etc. The server 710 may also be connected to removable or external non-volatile memory and/or storage (such as a removable memory card, memory key drive, networked storage, etc.) through respective input/output device interfaces 732.

Computer instructions for operating the remote server 710 and its various components may be executed by the controller(s)/processor(s) 716, using the memory 714 as temporary "working" storage at runtime. The computer instructions may be stored in a non-transitory manner in non-volatile memory 714, storage 708, and/or an external jdevice(s). Alternatively, some or all of the executable instructions may be embedded in hardware or firmware on the respective device in addition to, or instead of software.

The remote server 710 may also include an input/output device interface 732. A variety of components may be connected through the input/output device interface 732. Additionally, the remote server 710 may include an address/data bus 724 for conveying data among various components of the server. Each component of the remote server 710 may also be directly connected to other components in addition to (or instead of) being connected to other components across the bus 724.

The interface 732 may also connect the remote server 710 to a network 702 using any form of wired and/or wireless communication. For example, any one or more of 802.15.4 (ZIGBEE), 802.11 (WI-FI), 802.16 (WiMAX), BLUETOOTH, Z-WAVE, near field communication ("NFC"), cellular, CAT6, etc., may be used to enable communication to and from the remote server 710. For example, the input/output device interface 732 may connect to the network 702 via a wireless local area network (WLAN), (such as Wi-Fi) radio, Bluetooth, and/or wireless network radio, such as a radio capable of communication with a wireless communication network, such as a Long-Term Evolution (LTE) network, WiMAX network, 5G network, etc. A wired connection such as Ethernet may also be supported.

The server may also include one or more ML models 736. As discussed above, the ML model(s) 736 may be trained to determine parameters to optimize a current session based on both short term user engagement and long term user engagement. Likewise, the remote server 710 may include a media service 712 that performs different aspects of the disclosed implementations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 4 through 6, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
training a double machine learning ("ML") model to generate one or more parameters for a video streaming session between a device of a user and a media service, the training including:
training a first ML model of a first stage of the double ML model to at least:
receive, as a first input, a plurality of user characteristics corresponding to the user; and
provide, as a first output, a future user engagement residual;
training a second ML model of the first stage of the double ML model to at least:
receive, as a second input, the plurality of user characteristics corresponding to the user; and
provide, as a second output, a quality of experience ("QoE") residual; and
training a third ML model of a second stage of the double ML model to at least:
receive, as inputs, the future user engagement residual and the QoE residual, wherein the third ML model is trained to estimate the future user engagement residual based at least in part on the QoE residual to remove an impact of a confounder on a causal relationship between video streaming impairments of video streaming sessions and a predicted future engagement of the user with the media service; and
provide, as a third output, at least one parameter that may be applied to the video streaming sessions to optimize a QoE of the video streaming session based on the predicted future engagement of the user with the media service.

2. The computer-implemented method of claim 1, wherein the first ML model is a non-linear regression model.

3. The computer-implemented method of claim 1, wherein the third ML model is a causal decision model.

4. The computer-implemented method of claim 1, further comprising:
receiving, from a first device of a first user, a session start for a first video streaming session;
in response to receiving the session start, providing, to the double ML model, a first user characteristic corresponding to the first user;
receiving, from the double ML model, at least a first parameter; and
applying the first parameter to a streaming of a video from the media service to the first device.

5. The computer-implemented method of claim 4, further comprising:
determining a session history for the first user; and
providing at least a portion of the session history to the double ML model.

6. A computing system comprising:
one or more processors; and
a memory storing program instructions that, when executed by the one or more processors, cause the one or more processors to at least:
determine, for a media delivery session between a user device of a user and a media service, at least one of a user characteristic corresponding to at least one of the user or the user device, a device characteristic corresponding to the device, or a user session history corresponding to at least one of the user or the device;
provide, to a double machine learning ("ML") model, the at least one of the user characteristic, the device characteristic, or the user session history, wherein the double ML model includes an ML model trained to estimate a future user engagement residual based at least in part on a QoE residual to remove an impact of a confounder on a causal relationship between media streaming impairments of media delivery sessions and a predicted future engagement of the user with the media service;
receive from the double ML model, at least one parameter for use in optimizing a streaming of media between the user device and the media service as part of the media delivery session, wherein the at least one parameter is to optimize the media delivery session for the future user engagement of the user with the media service; and
apply the at least one parameter to the streaming.

7. The computing system of claim 6, wherein the double ML model includes, at least:
a first ML model of a first stage of the double ML model, the first ML model operable to at least:
receive, as a first input, at least one of the user characteristic, the device characteristic, or the user session history; and
provide, at least:
a first output that includes a future user engagement residual; and
a second output that includes a quality of experience ("QoE") residual; and
a second ML model of a second stage of the double ML model, the second ML model operable to at least:
receive, as inputs, the future user engagement residual and the QoE residual; and
provide, as a third output, the at least one parameter.

8. The computing system of claim 7, wherein the second ML model is trained to determine the at least one parameter based at least in part on an estimate of the future user engagement residual using the QoE residual.

9. The computing system of claim 7, wherein the first ML model and the second ML model are operable to remove an impact of a confounder.

10. The computing system of claim 6, wherein the future user engagement is at least one of a short term future user engagement between the user and the media service or a long term future user engagement between the user and the media service.

11. The computing system of claim 6, wherein the program instructions that, when executed by the one or more processors, further cause the one or more processors to at least:
determine, based at least in part on the user characteristic or the device characteristic, a cohort; and
select, based at least in part on the cohort, the double ML model, wherein the double ML model is trained based at least in part on session history associated with the cohort.

12. The computing system of claim 6, wherein the program instructions that, when executed by the one or more processors, further cause the one or more processors to at least:
receive a request for a media file;
determine, based at least in part on the media file, a session type; and select the double ML model based at least in part on the session type.

13. The computing system of claim 12, wherein:
the session type is indicative of a type of media that is to be delivered to the user device; and
the double ML model is trained, at least in part, using session history corresponding to the type of media of the session type.

14. The computing system of claim 6, wherein the at least one parameter is at least one of an adaptive bit rate, a compression rate, or a content delivery network from which the media is to be sent to the user device as part of the media delivery session.

15. The computing system of claim 6, wherein the double ML model is trained based at least in part using stored session history of a plurality of sessions between a plurality of client devices and the media service.

16. A method, comprising:
training a double machine learning (ML) model of a media service to provide at least one parameter to apply to a streaming video session, the at least one parameter determined based at least in part on a predicted future user engagement of a user with the media service, wherein the double ML model includes an ML model trained to estimate a future user engagement residual based at least in part on a quality of experience residual to remove an impact of a confounder on a causal relationship between video streaming impairments of streaming video sessions and a predicted future user engagement of the user with the media service;
providing, to the double ML model, a session history corresponding to the user;
receiving, from the double ML model, and in response to providing the session history, the at least one parameter; and
applying the at least one parameter to a video streaming session.

17. The method of claim 16, wherein the training includes:
training a first ML model of a first stage of the double ML model to process at least a portion of the session history and output a quality of experience residual for the streaming video session; and
training a second ML model of the first stage of the double ML model to process at a portion of the session history and to output a predicted future user engagement residual.

18. The method of claim 17, further comprising:
training a third ML model of a second stage of the double ML model to process the quality of experience residual and the predicted future user engagement residual and output the at least one parameter.

19. The method of claim 18, wherein:
the third ML model is configured to determine the at least one parameter by reducing the predicted future user engagement residual using the quality of experience residual.

20. The method of claim 17, wherein the double ML model is configured to at least:
consider one or more confounders that impact the predicted future user engagement as part of determining the at least one parameter.

* * * * *